United States Patent [19]

Willis

[11] 3,906,304

[45] Sept. 16, 1975

[54] HIGH VOLTAGE PROTECTION CIRCUIT

[75] Inventor: Donald Henry Willis, Indianapolis, Ind.

[73] Assignee: RCA Corporation, New York, N.Y.

[22] Filed: Jan. 31, 1974

[21] Appl. No.: 438,323

[52] U.S. Cl. .......... 315/379
[51] Int. Cl.$^2$ .......... H01J 29/52
[58] Field of Search .......... 315/20, 27 TD, 27 R, 28, 315/29; 313/381, 386, 379

[56] References Cited

UNITED STATES PATENTS

| | | | |
|---|---|---|---|
| 3,629,644 | 12/1971 | Waybright | 315/29 |
| 3,742,242 | 6/1973 | Morio et al. | 315/27 TD |
| 3,767,963 | 10/1973 | McArdley et al. | 315/20 |

*Primary Examiner*—Maynard R. Wilbur
*Assistant Examiner*—J. M. Potenza
*Attorney, Agent, or Firm*—Eugene M. Whitacre; Paul J. Rasmussen

[57] ABSTRACT

A horizontal deflection system driven auxiliary supply for a television receiver has as a rectifying device an integrated thyristor-rectifier (ITR). When the deflection system is operating under normal conditions, the rectifier portion of the ITR provides direct operating current through conventional filter circuitry to other receiver circuits, such as the vertical deflection system, whose performance is essential to the production of a viewable display. When the horizontal deflection system generates excessive voltage which results in an undesirable increase in the picture tube anode voltage derived from the deflection system, the peak cathode voltage of the rectifier portion, and thus the peak anode voltage of the thyristor portion of the ITR, rises. When the anode of the thyristor goes sufficiently positive with respect to its cathode, the voltage drop across the thyristor exceeds its breakover voltage and the thyristor begins to conduct heavily, removing the operating current from the other receiver circuits and rendering the display unviewable.

3 Claims, 5 Drawing Figures

HIGH VOLTAGE PROTECTION CIRCUIT

BACKGROUND OF THE INVENTION

This invention relates to high voltage protection systems for preventing the development of excessive voltage for cathode ray tubes.

Most television receivers utilize a winding of the horizontal output transformer for developing high voltages required for the focussing and anode votages of the picture tube. Some high voltage generating systems have the propensity to develop excessively high voltages under certain conditions such as failure of high voltage regulating components or high line voltage.

Excessively high generated voltages may under certain circumstances lead to component failures and in some instances to the emission from the picture tube of potentially harmful X-radiation. In recognition of this fact, manufacturers generally include in their receivers means for disabling the receivers when the generated high voltages produced therein exceed certain design limitations. Such protection systems generally act to render the kinescope display unviewable when the generated high voltage becomes high enough to make excessive X-ray emissions or component damage a likelihood.

A significant problem inherent in many such systems, however, is that they may be removed from the receiver or bypassed in the receiver without affecting normal receiver operation. Thus when excessive high voltages are generated, such systems either fail to function by virtue of the fact that they have been removed from circuit, or function but fail to affect receiver operation under abnormal high voltage conditions because they have been bypassed. Similarly, many such systems may experience component failure themselves and cease to function effectively to provide a warning when excessively high voltages are being generated by the receiver.

Ideally, a system is desired which would not affect receiver operation under normal conditions but which would provide the necessary warning by disrupting the viewable display when excessive voltages are being generated. Additionally, such a system should provide a similar warning when it has been bypassed and the receiver would not produce a viewable display if it were removed from the receiver. It should also be designed so that if it malfunctioned, the receiver would be incapable of producing a viewable display.

SUMMARY OF THE INVENTION

In accordance with the invention, a high voltage protection system is provided for rendering a display on a kinescope unviewable when the high voltage coupled to the kinescope exceeds a predetermined level. The high voltage protection system comprises a deflection system including a deflection winding, the deflection system being responsive to applied synchronizing waveforms for generating deflection current in the deflection winding, and means for producing a viewable display. Voltage generating means are coupled to the deflection system and to the means for producing a viewable display for generating operating voltage for the means for producing a viewable display. The voltage generating means include rectifying and switching means. The rectifying means are coupled for rectifying alternating current voltage signals generated in the voltage generating means for providing operating voltage to the means for producing a viewable display. The switching means are coupled in antiparallel relation with the rectifying means and are switchable into a state of conduction when the generated and rectified voltage across the rectifying and switching means exceeds a predetermined value for impairing rectification of the alternating current voltage thereby rendering the display unviewable.

A more detailed description of the invention is given in the following specification in conjunction with the accompanying drawings of which:

FIG. 1 is a partly blocked and partly schematic circuit diagram of a high voltage protection circuit embodying the invention; and FIGS. 2–5 illustrate waveforms obtained at various points in the circuit of FIG. 1.

DESCRIPTION OF THE PREFERRED EMBODIMENT

Figure 1:
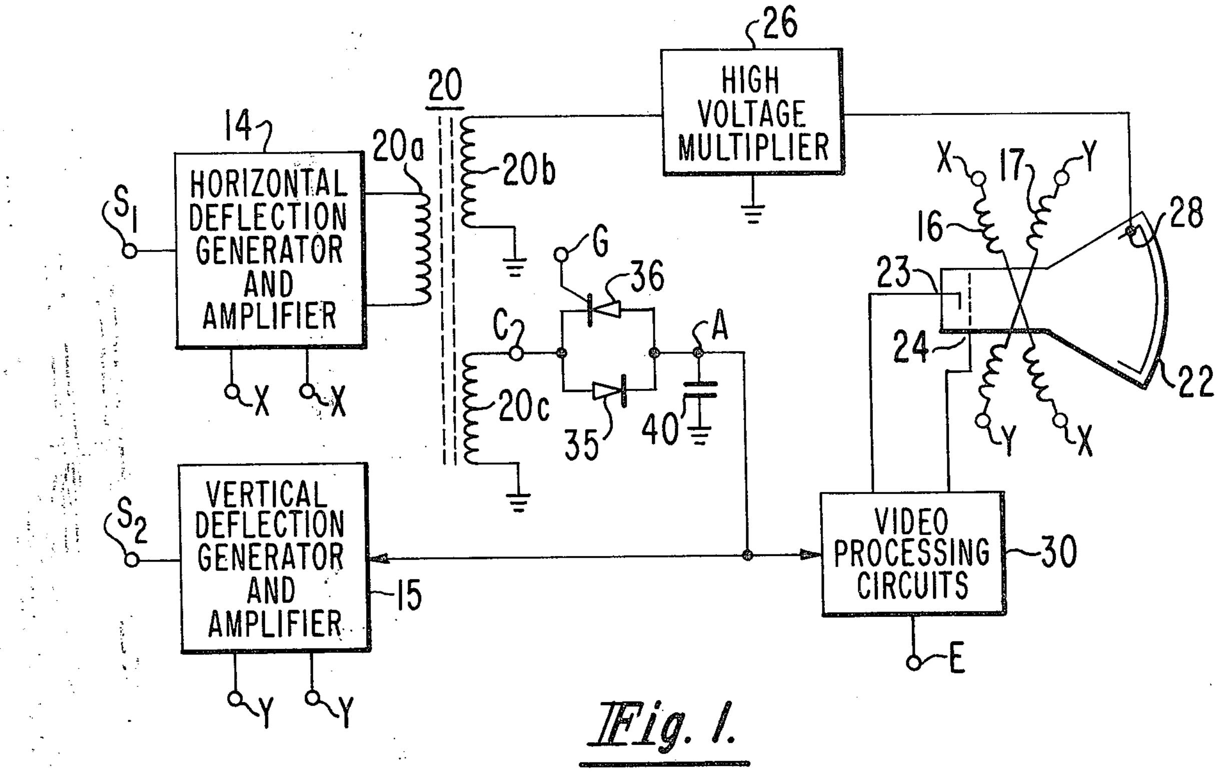

In a preferred embodiment of the invention illustrated in FIG. 1, a horizontal deflection synchronizing signal coupled to a terminal $S_1$ synchronizes the operation of a conventional horizontal deflection generator and amplifier 14 such as utilized in television receivers. Deflection generator and amplifier 14 produces horizontal deflection current which is coupled through a pair of terminals X—X to a pair of horizontal deflection windings 16 disposed around a kinescope 22. Deflection generator and amplifier 14 also is coupled to a primary winding 20*a* of a horizontal output transformer 20. A high voltage winding 20*b* of horizontal output transformer 20 is coupled between ground and an input terminal of a high voltage multiplier 26. An output terminal of high voltage multiplier 26 is coupled to a high voltage anode electrode terminal 28 of kinescope 22. High accelerating potential is supplied to kinescope 22 as voltage variations appearing across winding 20*b* in response to current flow in winding 20*a* are rectified and multiplied by high voltage multiplier 26.

Vertical deflection sync signals coupled to a terminal $S_2$ synchronize the operation of a vertical deflection generator and amplifier 15. Vertical deflection generator and amplifier 15 supplies vertical deflection current through a pair of terminals Y—Y to a pair of vertical deflection windings 17 disposed around kinescope 22.

Video signals are coupled to an input terminal E of video processing circuits 30, output terminals of which are coupled to one or more control grids represented by a grid 24 of kinescope 22. Video processing circuits 30 may include such circuits as video amplification stages and chrominance circuitry. Circuits 30 function to provide control voltages to cathode 23 and grid 24 so that they may produce a viewable display on kinescope 22 when properly synchronized vertical and horizontal deflection currents flow through windings 17 and 16 respectively.

Direct current operating voltage for circuits such as video processing circuits 30 and vertical deflection generator and amplifier 15 are provided by rectifying voltage variations occurring across an auxiliary winding of output transformer 20 in a manner similar to that described above in connection with high voltage generation in winding 20*b*. Thus, a winding 20*c* of horizontal output transformer 20 is coupled between ground and a terminal C.

A two terminal network comprising a rectifying diode 35 and a silicon controlled rectifier (SCR) 36 coupled in antiparallel relation is coupled between terminal C and terminal A. This network preferably may comprise an integrated thyristor-rectifier (ITR). The anode of diode 35 and the cathode of SCR 36 are coupled to terminal C and the cathode of diode 35 and the anode of SCR 36 are coupled to terminal A. A gate electrode, terminal G of SCR 36 is left unconnected and in the fabrication of ITR's useful in this invention may not even be provided with an external lead.

A capacitor 40 is coupled between terminal A and ground and serves to filter and store the alternating current generated in winding 20*c* and rectified by diode 35 of the ITR. This rectified and filtered current is coupled from terminal A to video processing circuits 30 and to vertical deflection generator and amplifier 15 to supply direct operating current to these circuits. Of course, it is to be understood that while FIG. 1 shows horizontal output transformer 20 as an isolation type transformer, the invention may also be employed with a horizontal deflection system utilizing an autotransformer.

It should be noted that auxiliary power may be derived from other sources which would give an indication of an overvoltage condition in the voltage being supplied to kinescope 22. For example, it is known that in an SCR horizontal deflection system such as that described in U.S. Pat. No. 3,452,244 issued to W. F. W. Dietz, auxiliary power may be supplied by rectifying voltage variations appearing across the input reactor. The present invention is useful for providing power to video processing circuits 30 and vertical deflection circuits 15 by rectifying such voltage variations in the input reactor. Such a system gives an indication of overvoltage malfunction in the high voltage generator by monitoring the amplitude of the voltage variations across the input reactor. It should further be noted that while the embodiment of FIG. 1 illustrates a system which supplies voltage to both video processing circuits 30 and vertical deflection circuit 15, horizontal deflection derived auxiliary power may be supplied only to one or the other of these circuits.

Figure 2:
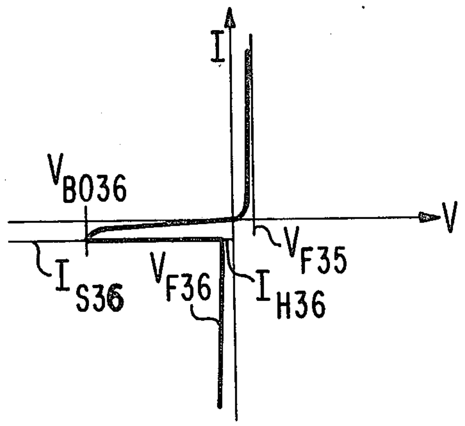

The current-voltage characteristic of the ITR comprising rectifier 35 and SCR 36 is shown in FIG. 2. The switching characteristics of the ITR are described in considerably detail in an article by R. W. Aldrich and N. Holonyak, Jr., "Two-Terminal Asymmetrical and Symmetrical Silicon Negative Resistance Switches," Journal of Applied Physics, Vol. 30, No. 11, November 1959, pp. 1819–1824 and references cited there, but are briefly set forth here to aid in understanding the present invention. The positive current and voltage curve is the forward biased characteristic of rectifier 35. This forward characteristic is that of a fast recovery type diode suitable for operation at the horizontal deflection rate. The reverse characteristic of the network comprising rectifier 35 and SCR 36 is similar to the forward characteristic of a typical SCR under approximately zero gate current conditions.

SCR 36 remains in the OFF state with relatively low forward current, which may be in the order of 10 microamperes, through it until the voltage across it reaches $V_{BO36}$. It is at this current and voltage, called the saturation current $I_{S36}$, and breakover voltage, $V_{BO36}$, that SCR 36 switches to the ON state, becoming readily conductive and exhibiting a forward voltage drop $V_{F36}$ of approximately 1 volt. SCR 36 remains in the ON state until the current through it decreases below the holding current $I_{H36}$ at which time SCR 36 switches to the OFF state again.

Thus, it may be seen that the network comprising rectifier 35 and SCR 36 serves to decrease the voltage at terminal A to a low level when the voltage across SCR 36 exceeds $V_{BO36}$, the breakover voltage of SCR 36. This rapid decrease in the voltage at terminal A disrupts the supply of direct operating current to video processing circuits 30 and to vertical deflection generator and amplifier 15.

The function of the preferred embodiment illustrated in FIG. 1 may be further explained in connection with the waveforms of FIGS. 3, 4 and 5. As the horizontal deflection flyback pulse appears across the horizontal output transformer primary winding 20*a*, a similar voltage pulse, $V_C$ of FIG. 3, appears across auxiliary supply winding 20*c*. This voltage pulse, which is the voltage at terminal C of winding 20*c*, is rectified by rectifier 35 of the network comprising rectifier 35 and SCR 36. The rectified and filtered voltage is stored in capacitor 40 and is illustrated by the waveform $V_A$, the voltage at terminal A.

As direct operating current is provided to video processing circuits 30 and vertical deflection generator and amplifier 15 from the discharging of capacitor 40, $V_A$ decreases. When the next succeeding flyback pulse appears across windings 20*a* and 20*c* and is rectified by rectifier 35, capacitor 40 again charges from the flyback-derived voltage pulse $V_C$ across winding 20*c*.

Figure 3:
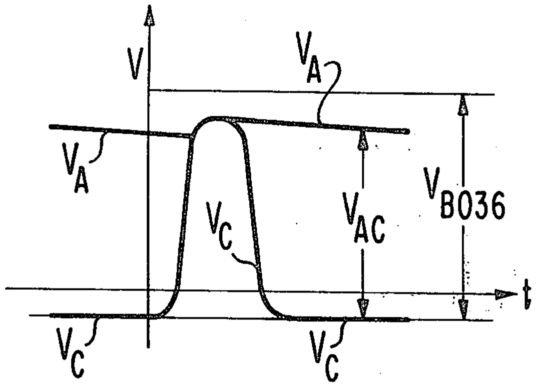

As FIG. 3 indicates, during normal operation of the horizontal deflection generator and amplifier, the total voltage difference $V_{AC}$ between $V_C$, the voltage at terminal C with respect to ground, and $V_A$, the voltage at terminal A with respect to ground, will at no time exceed $V_{BO36}$, the breakover voltage of SCR 36. Since the voltage generated across winding 20*c* and hence the voltage across terminals A-C is directly related to the voltage generated across windings 20*a* and 20*b*, the conduction state of SCR 36 serves to provide an indication of when the generated high voltage across winding 20*b* exceeds normal operating limits.

The voltage at which SCR 36 will break over into high forward conduction, i.e., turn ON, is a controllable parameter in the construction of the device. As FIG. 4 indicates, the device is selected to exhibit a breakdown voltage characteristic $V_{BO36}$ such that when excessively high voltage is being developed across winding 20*b*, the difference voltage between $V_A$ and $V_C$ shown in FIG. 4, will reach $V_{BO36}$ and SCR 36 will be placed in the highly conductive state as indicated at time $t_0$ of FIG. 4. As a result, the voltage at terminal A will be reduced to some low level, disrupting the supply of direct operating current to video processing circuits 30 and to vertical deflection generator and amplifier 15. The kinescope display will thereby be rendered unviewable, giving an indication to the viewer of a high voltage generator malfunction in the receiver requiring attention.

Figure 4:
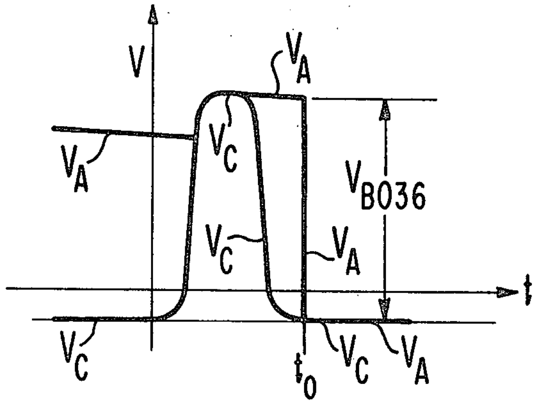
Figure 5:
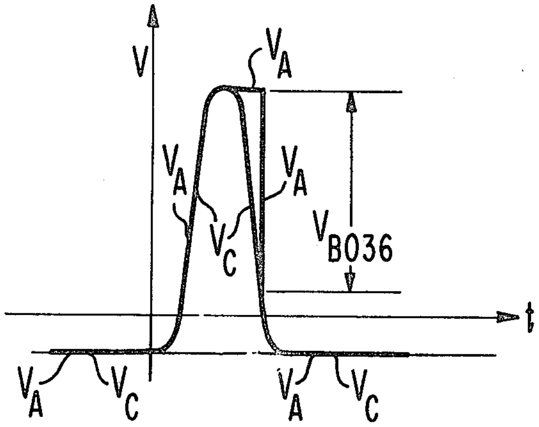

FIG. 5 is an illustration of the voltage waveforms at terminals A and C of FIG. 1 in the situation in which excessive voltage continues to be developed across winding 20*b* and similarly across winding 20*c* in successive cycles of horizontal deflection after the breakover voltage $V_{BO36}$ of SCR 36 has initially been reached, as illustrated in FIG. 4. It should be noted that after $V_{BO36}$ has initially been reached, SCR 36 will remain in a highly conductive state until the current through it decreases below the holding current $I_{H36}$ as illustrated in FIG. 2.

Therefore, as FIG. 5 illustrates, after the first occurrence of an overvoltage condition across winding 20*b*, if excessive voltage continues to be generated, the voltage at terminal A during the horizontal scanning interval will continue to be approximately the voltage at terminal C until the overvoltage condition is corrected. The voltage $V_A$ at terminal A will rise with the voltage pulse $V_C$ at terminal C as rectifier 35 rectifies it and stores it in capacitor 40. When the voltage $V_{AC}$ across terminals A and C reaches $V_{BO36}$, SCR 36 becomes conductive allowing the voltage at terminal A to fall to approximately the voltage at terminal C.

It should be noted that if SCR 36 is a slow-switching type, it may not switch into the non-conductive state between flyback pulses $V_C$. In this situation $V_A$ will be approximately $V_C$ from the time the overvoltage condition first appears until the condition is corrected. It may be seen that whether or not SCR 36 switches to the non-conductive state during the scanning interval, the kinescope display will remain unviewable in either situation until the condition resulting in excessive voltage across windings 20*b* and 20*c* is corrected.

It should be noted that since an ITR comprising diode 35 and SCR 36 is a two-terminal device, it is impossible to remove the ITR from active circuit connection by removing it from the receiver or by short circuiting it. In either situation, the ability of the receiver to produce a viewable display would be adversely affected since no rectified voltage would be supplied to terminal A for the operation of video processing circuits 30 or vertical deflection generator and amplifier 15.

Similarly, if an ITR were used to replace devices 35 and 36, a malfunction of the ITR itself would render the raster unviewable. Since in the ITR configuration devices 35 and 36 would have common junction areas, SCR 36 could not become short circuited or open circuited unless rectifier 35 did likewise. Thus it may be seen that when the ITR configuration is utilized to perform the functions of rectifier 35 and SCR 36 a shorted SCR 36 will result in waveform $V_C$ of FIG. 3 appearing at terminal A. Since the voltage at terminal A will be unrectified and no positive direct current operating voltage will be available to video processing circuits 30 or to vertical deflection generator and amplifier 15 for much of each horizontal deflection cycle, the resulting disturbance of the display will render it unviewable.

Similarly, if SCR 36 in the ITR configuration suffers an open circuit malfunction, rectifier 35 will be open circuited and no direct operating current will be supplied to circuits 30 or 15. Therefore, no display will be produced. It may be seen that the same analysis applies where auxiliary winding 20*c* is shorted or open circuited such as may occur during a malfunction.

What is claimed is:

1. A high voltage protection system for rendering a display on a kinescope unviewable when the high voltage coupled to said kinescope exceeds a predetermined level, comprising:

a deflection system including a deflection winding, said deflection system being responsive to applied synchronizing waveforms for generating deflection current in said deflection winding;

means for producing a viewable display; and voltage generating means coupled to said deflection system and to said means for producing a viewable display for generating operating voltage for said means for producing a viewable display, said voltage generating means including rectifying and switching means comprising an integrated thyristor-rectifier, a rectifier portion of which is coupled for rectifying alternating current voltage signals and for providing said operating voltage to said means for generating a viewable display and a thyristor portion of which switches into a state of conduction when said generated and rectified voltage across said integrated thyristor-rectifier exceeds said predetermined value for impairing said rectification thereby rendering said display unviewable.

2. A high voltage protection system for rendering a display on a kinescope unviewable when the high voltage coupled to said kinescope exceeds a predetermined level, comprising:

a deflection winding;

a deflection system coupled to said deflection winding for generating deflection current therein;

means for producing a viewable display on said kinescope;

means coupled to said deflection system for generating voltage variations in response to current flow in said deflection system; and rectifying and switching means comprising an integrated thyristor-rectifier having at least first and second states, said rectifier portion coupled for rectifying said generated voltage and supplying said rectified voltage to said means for producing a viewable display in said first state, and said thyristor portion coupled for decreasing said rectified voltage in said second state by forward conduction of said thyristor portion when said rectified voltage exceeds said generated voltage variations by said predetermined value for rendering said display unviewable.

3. A high voltage protection system for rendering a display on a kinescope unviewable when the high voltage coupled to said kinescope exceeds a predetermined level, comprising:

deflection means for generating deflection current in a deflection winding;

means for producing a viewable display on said kinescope;

means coupled to said deflection means for generating an alternating current voltage in response to said flow of current in said deflection means; and bidirectional conductive switching means comprising an integrated thyristor-rectifier coupled to said voltage generating means and to said means for producing a viewable display, a rectifier portion of which is coupled for rectifying said generated voltage and for supplying said rectified voltage to said means for producing a viewable display, said thyristor portion being coupled for switching into forward conduction to substantially inhibit said rectification when the forward voltage across said thyristor portion exceeds its forward breakover voltage.

* * * * *